United States Patent
Han

(10) Patent No.: US 9,582,124 B2
(45) Date of Patent: Feb. 28, 2017

(54) TOUCH SCREEN PANEL, FLAT PANEL DISPLAY APPARATUS INTEGRATED WITH THE TOUCH SCREEN PANEL, AND METHOD OF MANUFACTURING THE SAME

(71) Applicant: Samsung Display Co., Ltd., Yongin (KR)

(72) Inventor: Byung-Uk Han, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 121 days.

(21) Appl. No.: 14/064,728

(22) Filed: Oct. 28, 2013

(65) Prior Publication Data

US 2015/0029135 A1 Jan. 29, 2015

(30) Foreign Application Priority Data

Jul. 25, 2013 (KR) .......................... 10-2013-0088102

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 2203/04103* (2013.01); *G06F 2203/04111* (2013.01); *G06F 2203/04112* (2013.01)

(58) Field of Classification Search
CPC ........ G06F 3/041; G06F 3/0412; G06F 3/044; G06F 3/047; G06F 2203/0411
USPC .................. 345/173; 178/18.01, 18.03, 18.06
See application file for complete search history.

(56) References Cited

U.S. PATENT DOCUMENTS

| 7,265,686 | B2 * | 9/2007 | Hurst | G06F 3/0488 341/33 |
| 8,937,607 | B2 * | 1/2015 | Brown | G06F 3/044 345/174 |
| 2010/0013745 | A1 * | 1/2010 | Kim et al. | 345/76 |
| 2010/0277439 | A1 * | 11/2010 | Charlier et al. | 345/176 |
| 2011/0018838 | A1 * | 1/2011 | Lee | G06F 3/044 345/174 |

(Continued)

FOREIGN PATENT DOCUMENTS

| JP | WO 2013014883 A1 * | 1/2013 | ............. G06F 3/044 |
| KR | 10-2006-0023497 | 3/2006 | |

(Continued)

*Primary Examiner* — Jason Mandeville
(74) *Attorney, Agent, or Firm* — H.C. Park & Associates, PLC

(57) ABSTRACT

A touch screen panel, a flat panel display apparatus integrated touch screen panel, and a method of manufacturing the same. The touch screen panel includes: first touch detection patterns extending in a first direction and spaced apart from each other in a second direction perpendicular to the first direction; and second touch detection patterns extending in the second direction and spaced apart from each other in the first direction. Each of the first touch detection patterns includes a first transparent conductive pattern and a first edge conductive pattern surrounding an edge of the first transparent conductive pattern, and each of the second touch detection patterns includes a second transparent conductive pattern and a second edge conductive pattern surrounding an edge of the second transparent conductive pattern.

16 Claims, 6 Drawing Sheets

SECOND DIRECTION (Y)

FIRST DIRECTION (X)

(56) References Cited

U.S. PATENT DOCUMENTS

| | | |
|---|---|---|
| 2011/0306163 A1 | 12/2011 | Song et al. |
| 2012/0019486 A1* | 1/2012 | Kim et al. .................... 345/176 |
| 2012/0062481 A1 | 3/2012 | Kim et al. |
| 2012/0229414 A1* | 9/2012 | Ellis ........................ G06F 3/044 345/174 |
| 2012/0327021 A1* | 12/2012 | Ryu ........................ G06F 3/044 345/174 |
| 2013/0154996 A1* | 6/2013 | Trend ................ H03K 17/9622 345/174 |
| 2013/0162547 A1* | 6/2013 | Yoo ........................ G06F 3/044 345/173 |
| 2013/0168138 A1* | 7/2013 | Yamazaki ............ H05K 1/0296 174/253 |
| 2013/0189502 A1* | 7/2013 | Takahashi et al. ........ 428/195.1 |
| 2013/0201348 A1* | 8/2013 | Li et al. .......................... 348/174 |
| 2014/0139761 A1* | 5/2014 | Yanagawa ............... G06F 3/044 349/12 |

FOREIGN PATENT DOCUMENTS

| | | |
|---|---|---|
| KR | 10-2010-0073045 | 7/2010 |
| KR | 10-2011-0017674 | 2/2011 |
| KR | 10-2011-0048683 | 5/2011 |
| KR | 10-2011-0136180 | 12/2011 |
| KR | 10-2012-0060926 | 6/2012 |
| KR | 10-2012-0080930 | 7/2012 |

\* cited by examiner

TOUCH SCREEN PANEL, FLAT PANEL DISPLAY APPARATUS INTEGRATED WITH THE TOUCH SCREEN PANEL, AND METHOD OF MANUFACTURING THE SAME

CROSS-REFERENCE TO RELATED APPLICATION

This application claims priority from and the benefit of Korean Patent Application No. 10-2013-0088102, filed on Jul. 25, 2013, which is hereby incorporated by reference for all purposes as if fully set forth herein.

BACKGROUND

Field

Exemplary embodiments of the present invention relate to a touch screen panel and a flat panel display apparatus, and a method of manufacturing the same.

Discussion of the Background

A touch screen panel is an input apparatus that enables a user to input a command by using his/her hand or an object to manipulate elements displayed on a screen of a display apparatus. The touch screen panel is combined with the display apparatus to convert a location of a touch into an electrical signal. Such a touch screen panel may replace a separate input apparatus, such as a keyboard or a mouse, and thus, its application range is extending.

The touch screen panel is implemented by using well-known resistive, optical, and capacitive methods. A capacitive touch screen panel detects a change in capacitance between a driving electrode and a sensitivity electrode of the touch screen panel, when a hand or an object touches the surface of the touch screen panel, and converts a location of the touch into an electrical signal.

When the touch screen panel is attached to an external surface of a flat panel display apparatus, such as a liquid crystal display (LCD) apparatus, an organic light emitting display apparatus, etc., there are problems in that an entire thickness of a product increases, and manufacturing costs increase. Another problem is that, when the touch screen panel is directly formed on the external surface of the flat panel display apparatus during manufacturing of the flat panel display apparatus, a low temperature manufacturing process needs to be utilized because an internal device of the flat panel display apparatus, such as an organic emissive layer of the organic light emitting display apparatus, may be vulnerable to high temperatures. However, the low temperature process generally results in a high resistance of a conductive layer of the touch screen panel, which undesirably decreases detection speed and reduces a signal to noise ratio (SNR).

The above information disclosed in this Background section is only for enhancement of understanding of the background of the invention and, therefore, it may contain information that does not form the prior art that is already known in this country to a person of ordinary skill in the art.

SUMMARY

Exemplary embodiments of the present invention include a touch screen panel having a low resistance conductive pattern.

Exemplary embodiments of the present invention include a flat panel display apparatus integrated touch screen panel having a reduced thickness.

Exemplary embodiments of the present invention include a method of manufacturing a flat panel display apparatus integrated touch screen panel.

Additional aspects will be set forth in part in the description which follows and, in part, will be apparent from the description, or may be learned by practice of the invention.

An exemplary embodiment of the present invention discloses a touch screen panel including a first touch detection patterns extending in a first direction and spaced apart from each other in a second direction perpendicular to the first direction; and second touch detection patterns extending in the second direction and spaced apart from each other in the first direction. Each of the first touch detection patterns may include a first transparent conductive pattern and a first edge conductive pattern surrounding an edge of the first transparent conductive pattern. Each of the second touch detection patterns may include a second transparent conductive pattern and a second edge conductive pattern surrounding an edge of the second transparent conductive pattern.

An exemplary embodiment of the present invention also discloses a flat panel display apparatus integrated touch screen panel including: a substrate extending in a first direction and a second direction perpendicular to the first direction; a display unit disposed on the substrate and including pixels that display an image; a sealing member disposed on the substrate and sealing the display unit; and a first touch screen panel disposed on one of the substrate and the sealing member. The first touch screen panel may include first touch detection patterns electrically connected in the first direction and second touch detection patterns electrically connected in the second direction. Each of the first touch detection patterns and the second touch detection patterns may include a first transparent conductive pattern, and a second conductive pattern surrounding an edge of the first transparent conductive pattern.

An exemplary embodiment of the present invention discloses a method of manufacturing a flat panel display apparatus integrated touch screen panel, the method including preparing a substrate extending in a first direction and a second direction perpendicular to the first direction; forming a display unit including pixels on the substrate; forming a sealing member sealing the display unit on the substrate; and forming a touch screen panel on one of the substrate and the sealing member. The forming of the touch screen panel may include forming a first transparent conductive pattern; forming a second conductive pattern surrounding an edge of the first transparent conductive pattern; and lowering resistivity of the second conductive pattern and a sheet resistance of the first transparent conductive pattern by applying a joule heat generation voltage to the second conductive pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention

DETAILED DESCRIPTION OF THE ILLUSTRATED EMBODIMENTS

Figure 1A:
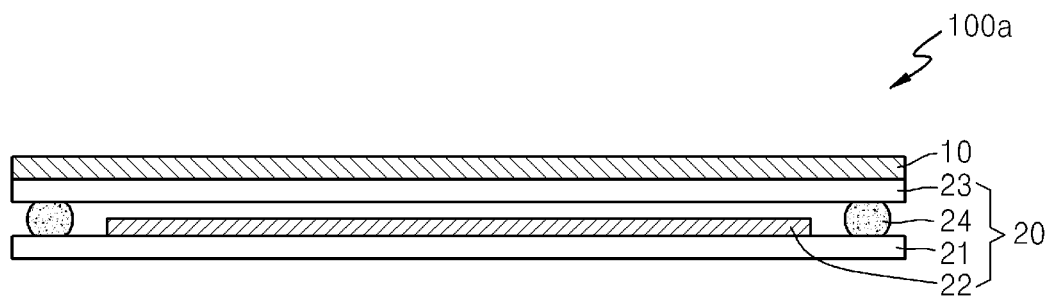
FIG. 1A-FIG. 1D are schematic cross-sectional views of flat panel display apparatuses integrated with touch screen panels according to exemplary embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, like reference numerals denote like elements, and the sizes and thicknesses of layers and regions may be exaggerated or downscaled for clarity.

The terms used herein are for the purpose of describing particular embodiments only and are not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. While such terms as "first," "second," etc., may be used to describe various components, such components must not be limited to the above terms. The above terms are used only to distinguish one component from another. Hereinafter, when a first feature is connected, is combined, or contacts a second feature, a third feature may be disposed between the first and second features. Also, when a first component is disposed on a second component, a third component may be disposed between the first and second components. However, if it is described that the first component is directly disposed on the second component, then the third component is not disposed between the first and second components.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items. Expressions such as "at least one of," when preceding a list of elements, modify the entire list of elements and do not modify the individual elements of the list.

FIG. 1A-FIG. 1D are schematic cross-sectional views of flat panel display apparatuses 100a through 100d, each containing an integrated touch screen panel according to an exemplary embodiment of the present invention.

Referring to FIG. 1A, the flat panel display apparatus 100a integrated touch screen panel includes a display apparatus 20 and a touch screen panel 10 disposed on a top surface of the display apparatus 20. The display apparatus 20 includes a substrate 21, a display unit 22 disposed on the substrate 21, a sealing substrate 23 for sealing the display unit 22, and a sealant 24.

The touch screen panel 10 and the display apparatus 20 are integrally formed. That is, the touch screen panel 10 and the display apparatus 20 are separately manufactured, and then the touch screen panel 10 is directly formed on a top surface of the display apparatus 20 without using an adhesive to join the touch screen panel 10 and the display apparatus 20. Thus, the flat panel display apparatus 100a including an integrated touch screen panel may have a small thickness. The touch screen panel 10 is manufactured using a process of manufacturing the display apparatus 20, and thus, manufacturing costs of the flat panel display apparatus 100a may be reduced.

At least two methods may be used to directly form the touch screen panel 10 on the top surface of the display apparatus 20. A first method forms the display unit 22 on the substrate 21, forms the touch screen panel 10 on the sealing substrate 23, and joins the substrate 21 and the sealing substrate 23 by using the sealant 24. The substrate 21 and the sealing substrate 23 should maintain rigidity so as to join the substrate 21 and the sealing substrate 23, and thus, thicknesses of the substrate 21 and the sealing substrate 23 may be greater than a preset thickness. Thus, it is difficult to reduce the thickness of the flat panel display apparatus 100a.

A second method joins the substrate 21, in which the display unit 22 is formed, and the sealing substrate 23, and forms the touch screen panel 10 on the sealing substrate 23. In the second method, the substrate 21 and the sealing substrate 23 are formed to be relatively thin by using an etch-back process or a mechanical chemical polishing process before forming the touch screen panel 10. Thus, the flat panel display apparatus 100a having a small thickness may be achieved. However, because the sealing substrate 23 is very thin, the display apparatus 20 may be easily damaged by a process of forming the touch screen panel 10 on the thin sealing substrate 23. For example, when a high temperature process is used to form the touch screen panel 10, the display unit 22 may be damaged by heat generated during the high temperature process, or the substrate 21 or the sealing substrate 23 may be unintentionally altered. In particular, when the display apparatus 20 is an organic light emitting display apparatus including an organic emissive layer, the organic emissive layer may be damaged by a high temperature. Thus, the touch screen panel 10, in particular, a conductive layer of the touch screen panel 10, should be formed utilizing a low temperature process. For example, an inkjet printing method using a conductive paste may be used to form the conductive layer.

When the conductive layer is formed through the low temperature process, the conductive layer has a high resistance, as compared to a conductive layer formed through a high temperature process, such as a sputtering process. When the conductive layer of the touch screen panel 10 has the high resistance, a resistive-capacitive (RC) delay increases due to parasitic capacitance and the high resistance, which attenuates a signal, and thus, it is difficult to detect the signal. Therefore, resistance of the conductive layer formed through the low temperature process should be reduced.

The touch screen panel 10 includes first touch detection patterns electrically connected in a first direction and second touch detection patterns electrically connected in a second direction. Each of the first and second touch detection patterns includes a transparent first conductive pattern and a second conductive pattern surrounding an edge of the first conductive pattern. The second conductive pattern may have a lower resistivity than that of the first conductive pattern. According to another exemplary embodiment, the second conductive pattern operates as a wiring that generates a joule heat that reduces the resistivity of the second conductive pattern, and further reduces a sheet resistance of the first conductive pattern. Thus, the conductive layer of the touch screen panel 10 may have a low resistance, even though the conductive layer is formed through the low temperature process.

The substrate 21 may be an insulating rigid substrate formed of a transparent glass material having silicon dioxide ($SiO_2$) as a main component. According to another exemplary embodiment, the substrate 21 may be an insulating flexible substrate formed of a transparent plastic material. According to another exemplary embodiment, the substrate 21 is a conductive substrate formed of a thin film metal material. In a bottom emissive type display unit, in which an image is displayed toward the substrate 21, the substrate 21 is formed of a transparent material. However, in a top emissive type display unit in which the image is displayed toward the sealing substrate 23, the substrate 21 is not necessarily formed of the transparent material. In this case, the substrate 21 may be formed of metal.

The display unit 22 may be a bottom emissive type display unit that displays an image toward the sealing substrate 23. The display unit 22 includes pixels, each including a pixel driving circuit including thin film transistors (TFTs) and at least one capacitor and a display device driven by the pixel driving circuit. The display device may be a light emitting diode (LED), such as an organic light emitting diode (OLED). The LED is a self-light emitting device that emits an amount of light that is electrically controlled by the pixel driving circuit. According to another exemplary embodiment, the display device may be a liquid crystal device. The liquid crystal device is a device whose light transmittance is electrically controlled by the pixel driving circuit.

The sealing substrate 23 may be formed as a transparent glass substrate having silicon dioxide ($SiO_2$) as the main component or a transparent plastic substrate. The sealing substrate 23 enables the display unit 22 to display an image, and prevents external air and moisture from penetrating into the display unit 22.

Edges of the substrate 21 and the sealing substrate 23 are coupled to each other by using the sealant 24 so as to seal a space between the substrate 21 and the sealing substrate 23.

Figure 1B:
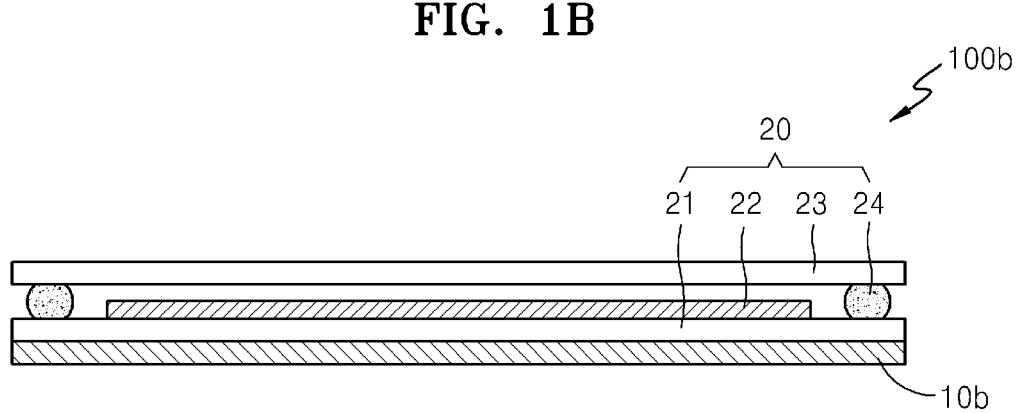

Referring to FIG. 1B, the flat panel display apparatus 100b includes the display apparatus 20 and a touch screen panel 10b disposed on a top surface of the display apparatus 20. The display apparatus 20 is described with reference to FIG. 1A, and thus, a description thereof will not be repeated. However, the display apparatus 20 of FIG. 1B is a bottom emissive type display apparatus in which an image is displayed toward the substrate 21. In this case, the substrate 21 is formed of a transparent material, and the sealing substrate 23 is not necessarily formed of the transparent material.

The touch screen panel 10b is materially the same as the touch screen panel 10 described with reference to FIG. 1A. As described with reference to FIG. 1A, the touch screen panel 10b may be formed through a low temperature process, and may include a conductive layer having a low resistance. Thus, as shown in FIG. 1B, the touch screen panel 10b may be formed on a bottom surface of the display apparatus 20, i.e., a bottom surface of the substrate 21.

Figure 1C:
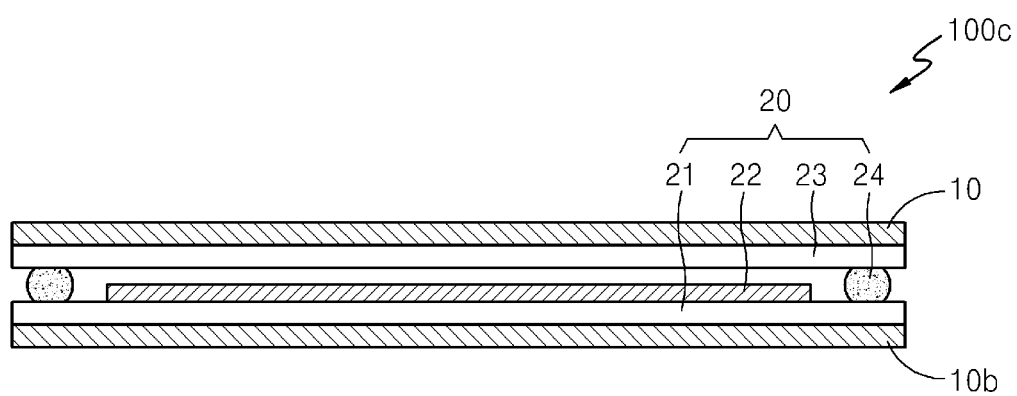

Referring to FIG. 1C, the flat panel display apparatus 100c integrated touch screen panel includes the display apparatus 20, the touch screen panel 10 disposed on a top surface of the display apparatus 20, and the touch screen panel 10b disposed on a bottom surface of the display apparatus 20. The display apparatus 20 is described with reference to FIG. 1A, and thus a description thereof will not be repeated. However, the display apparatus 20 of FIG. 1C is a top and bottom emissive type display apparatus in which an image is displayed in both directions of the substrate 21 and the sealing substrate 23. In this case, the substrate 21 and the sealing substrate 23 are formed of a transparent material. The display apparatus 20 may be a transparent display apparatus. The transparent display apparatus is a display apparatus that allows a user to see through what is displayed on two sides of a screen. In this case, internal devices of the display apparatus 20 may be formed of the transparent material or may be formed to have a thickness that is too small to be visible to the naked eye. For example, a TFT of the display apparatus 20 may be formed of a transparent semiconductor oxide and a transparent electrode. The display apparatus 20 may include a display region in which a display device is disposed, and a transparent region through which what is displayed on the screen is seen.

The touch screen panel 10 is materially the same as the touch screen panel 10 described with reference to FIG. 1A. The touch screen panel 10b is materially the same as the touch screen panel 10b described with reference to FIG. 1B. As described with reference to FIGS. 1A and 1B, the touch screen panels 10 and 10b may be formed through a low temperature process, and may include conductive layers having a low resistance. Thus, as shown in FIG. 1C, the touch screen panels 10 and 10b may be respectively formed on top and bottom surfaces of the display apparatus 20, i.e., a top surface of the sealing substrate 23 and a bottom surface of the substrate 21.

Figure 1D:
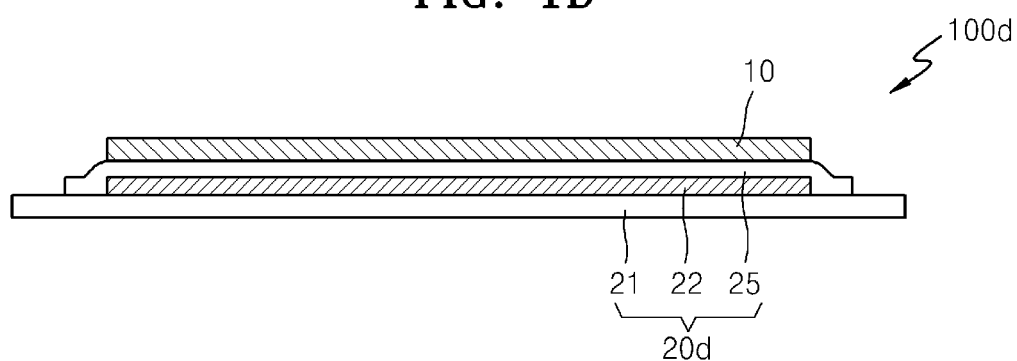

Referring to FIG. 1D, the flat panel display apparatus 100d includes a display apparatus 20d and the touch screen panel 10 disposed on a top surface of the display apparatus 20d. The display apparatus 20d includes the substrate 21, the display unit 22 disposed on the substrate 21, and a thin film encapsulation layer 25 for sealing the display unit 22. The substrate 21 and the display unit 22 are described with reference to FIG. 1A, and thus, redundant descriptions thereof will not be provided.

The thin film encapsulation layer 25 includes at least one organic layer and/or at least one inorganic layer so as to protect the display unit 22 disposed on the substrate 21 from external air and moisture. The thin film encapsulation layer 25 may include at least one organic layer and at least one inorganic layer that are alternately stacked. According to another exemplary embodiment, the thin film encapsulation layer 25 may include an organic layer directly disposed on the display unit 22 and/or an organic layer disposed on an uppermost layer of the thin film encapsulation layer 25.

The organic layer may be formed of a polymer, and may be a single layer or multiple layers formed of polyethylene terephthalate, polyimide, polycarbonate, epoxy, polyethylene polyacrylate. For example, the e organic layer may include a high molecular weight monomer component including a diacrylate-based monomer and a triacrylate-based monomer. The monomer component may further include a monoacrylate-based monomer. The monomer component may further include a well-known photoinitiator such as TPO (2,4,6-Trimethylbenzoyl-diphenyl-phosphineoxide). The inorganic layer may be a single layer or multi-layer including a metal oxide or a metal nitride. For example, the inorganic layer may include one selected from the group consisting of $SiN_x$, $Al_2O_3$, $SiO_2$, and $TiO_2$.

A halogenized metal layer including LiF may be further disposed between the display unit 22 and the thin film encapsulation layer 25. The halogenized metal layer may prevent the display unit 22 from being damaged when the inorganic layer of the thin film encapsulation layer 25 is formed using a sputtering method or plasma deposition method.

The display apparatus 20d may be a flexible display apparatus. In this case, the substrate 21 is a flexible substrate, and the thin film encapsulation layer 25 may be flexible.

The touch screen panel 10 is materially the same as the touch screen panel 10 described with reference to FIG. 1A. As described with reference to FIG. 1A, the touch screen panel 10 may be formed through a low temperature process, and may include a conductive layer having a low resistance. Thus, as shown in FIG. 1D, the touch screen panel 10 may be formed on the thin film encapsulation layer 25.

Although not shown, a touch screen panel may be formed on a bottom surface of the display apparatus 20d including the thin film encapsulation layer 25, and touch screen panels may be formed on top and bottom surfaces of the display apparatus 20d including the thin film encapsulation layer 25.

Figure 2:
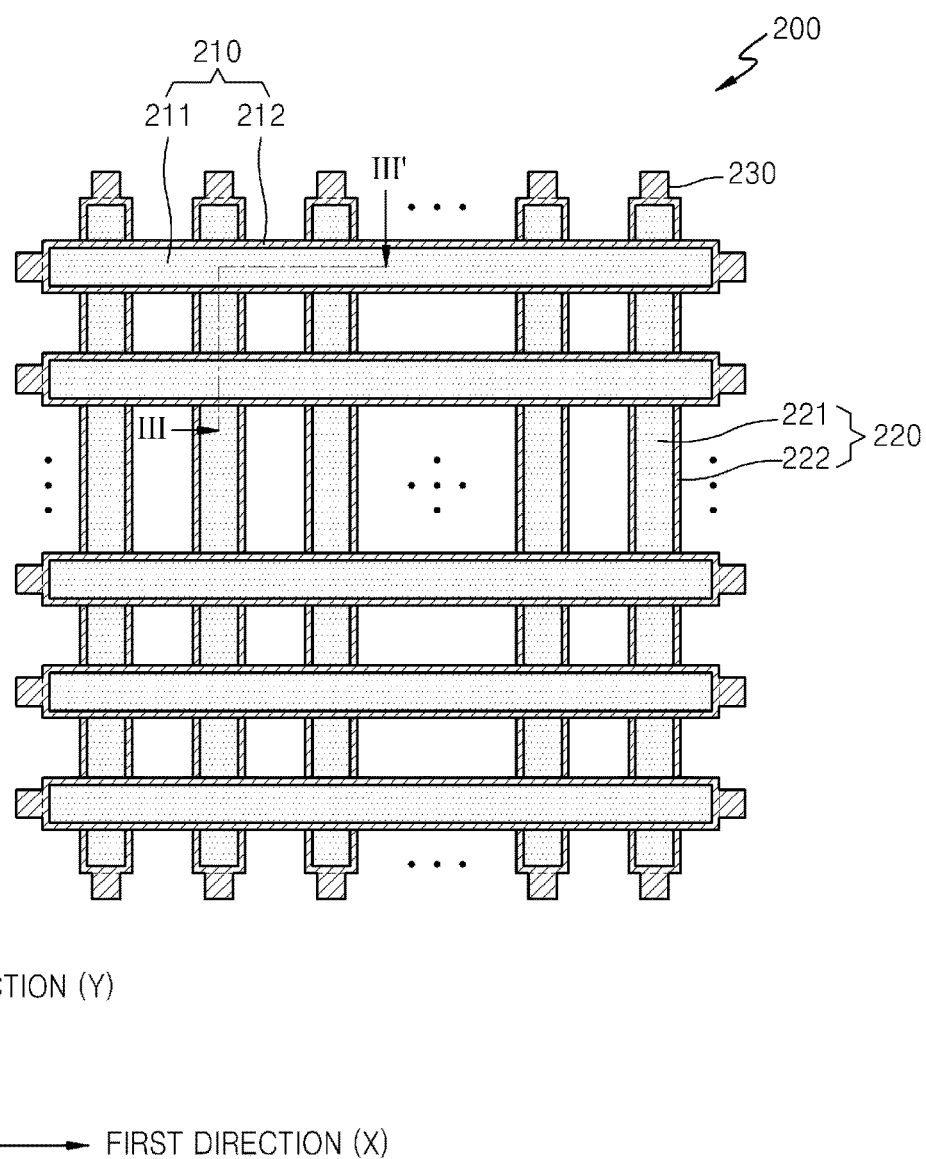
FIG. 2 is a schematic plan view of a touch screen panel according to an exemplary embodiment of the present invention.

FIG. 2 is a schematic plan view of a touch screen panel 200 according to an exemplary embodiment of the present invention.

Referring to FIG. 2, the touch screen panel 200 includes first touch detection patterns 210 and second touch detection patterns 220. The first touch detection patterns 210 extend in a first direction X, and the second touch detection patterns 220 extend in a second direction Y. The first direction X and the second direction Y are perpendicular to each other. According to another exemplary embodiment, an angle between the first direction X and the second direction Y may be arbitrarily chosen. The first touch detection patterns 210 are spaced apart from each other in the second direction Y, and the second touch detection patterns 220 are spaced apart from each other in the first direction X.

Although not shown, a touch detection controller that detects a touch location when a hand or an object touches the touch screen panel 200 may be disposed in the touch screen panel 200, in the display apparatuses 20 and 20d of FIGS. 1A through 1D, or in an external apparatus. Although not shown, the touch screen panel 200 may further include a wiring for connecting the first touch detection patterns 210 and the second touch detection patterns 220 to the touch detection controller.

The first touch detection patterns 210 function as a driving electrode, and the second touch detection patterns 220 function as a detection electrode. When driving voltages are sequentially applied to the first touch detection patterns 210, a signal is generated in the second touch detection patterns 220 due to capacitance between the first touch detection patterns 210 and the second touch detection patterns 220. If a touch substance, such as the hand or the object, touches the touch screen panel 200, capacitance between the touch substance and the first touch detection patterns 210 and capacitance between the touch substance and the second touch detection patterns 220 influence the capacitance between the first touch detection patterns 210 and the second touch detection patterns 220. Thus, a modified signal that is different from the original signal is generated in the second touch detection patterns 220 corresponding to a touch location. The touch detection controller detects the first touch detection patterns 210 to which the driving voltages are applied and the second touch detection patterns 220 in which the modified signal is detected, and thus the touch location is detected. According to another exemplary embodiment, a different touch detection method may be applied.

The first touch detection patterns 210 include a first transparent conductive pattern 211 and a first edge conductive pattern 212 surrounding an edge of the first transparent conductive pattern 211. The second touch detection patterns 220 include a second transparent conductive pattern 221 and a second edge conductive pattern 222 surrounding an edge of the second transparent conductive pattern 221. At least a part of the first edge conductive pattern 212 directly contacts the edge of the first transparent conductive pattern 211. At least a part of the second edge conductive pattern 222 directly contacts the edge of the second transparent conductive pattern 221.

The first transparent conductive pattern 211 and the second transparent conductive pattern 221 may be formed of a transparent metal oxide. For example, the first transparent conductive pattern 211 and the second transparent conductive pattern 221 may include at least one selected from the group consisting of transparent conductive oxide materials such as indium tin oxide (ITO), indium zinc oxide (IZO), zinc oxide (ZnO), indium oxide ($In_2O_3$), indium gallium oxide (IGO), and aluminum zinc oxide (AZO). The first transparent conductive pattern 211 and the second transparent conductive pattern 221 may be formed of the same material. According to another exemplary embodiment, the first transparent conductive pattern 211 and the second transparent conductive pattern 221 may be formed of different materials.

The first edge conductive pattern 212 and the second edge conductive pattern 222 may be formed of a metal material. For example, the first edge conductive pattern 212 and the second edge conductive pattern 222 may include at least one selected from the group consisting of aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and copper (Cu). The first edge conductive pattern 212 and the second edge conductive pattern 222 may be formed of a metal paste or a conductive ink selected from the group consisting of Au, Ag, Pt, Cu, Ni, and Al. According to another exemplary embodiment, the first edge conductive pattern 212 and the second edge conductive pattern 222 may include a carbon nano tube. The first edge conductive pattern 212 and the second edge conductive pattern 222 may be formed of the same material. According to another exemplary embodiment, the first edge conductive pattern 212 and the second edge conductive pattern 222 may be formed of different materials.

The resistivity of materials of the first edge conductive pattern 212 and the second edge conductive pattern 222 may be lower than that of materials of the first transparent conductive pattern 211 and the second transparent conductive pattern 221. Thus, the overall resistance of the first touch detection patterns 210 and the second touch detection patterns 220 is reduced, and thus an RC delay is reduced, thereby enabling prompt detection of the touch location. Furthermore, attenuation of a signal is reduced, which reduces erroneous detection of the touch location due to noise, thereby enabling more accurate detection of the touch location.

The first touch detection patterns 210 and the second touch detection patterns 220 are insulated from each other so as to generate a capacitance therebetween. Although not shown, an insulating layer (240 of FIG. 3) may be disposed between the first touch detection patterns 210 and the second touch detection patterns 220. According to another exemplary embodiment, insulating patterns (245 of FIG. 4) may be disposed where the first touch detection patterns 210 and the second touch detection patterns 220 cross each other.

The first transparent conductive pattern 211 and the second transparent conductive pattern 221 are formed through a low temperature process. The first transparent conductive pattern 211 and the second transparent conductive pattern 221 may be formed by using a screen printing method that uses a paste of a transparent metal oxide. The screen printing method forms a pattern on a printing member by placing a screen in which an opening with a pattern is formed on the printing member and using a squeegee to tightly adhere a paste provided on the screen on the printing member through the opening with the pattern. The screen may use a plastic material, such as nylon or polyester, in addition to a metal material. The opening with the pattern may be formed using a photolithographic process and a selective etching process. A conductive paste or an insulating paste may be used according to a pattern that is to be formed on the printing member. The first transparent conductive pattern 211 and the second transparent conductive pattern 221 may be formed by using an ITO paste.

According to another exemplary embodiment, the first transparent conductive pattern 211 and the second transparent conductive pattern 221 may be formed using an inkjet printing method that uses a conductive ink including the transparent metal oxide. The inkjet printing method is a non-contact printing method of forming a pattern which utilizes very small ink drops colliding on the printing member. The pattern is formed as regularly arranged ink drops. The first transparent conductive pattern 211 and the second transparent conductive pattern 221 may be formed by coating ink in a liquid state on a substrate by melting ITO particles in a solvent.

The first transparent conductive pattern 211 and the second transparent conductive pattern 221 are formed through the low temperature process. The first edge conductive pattern 212 and the second edge conductive pattern 222 may be formed using the screen printing method that uses a metal paste including metal nano particles. The first edge conductive pattern 212 and the second edge conductive pattern 222 may be formed using the inkjet printing method that uses the conductive ink including metal.

According to another exemplary embodiment, the touch screen panel 200 may further include pads 230 connected to both ends of the first touch detection patterns 210 and the second touch detection patterns 220. The pads 230 may be directly connected to both ends of the first edge conductive pattern 212 and the second edge conductive pattern 222. According to another exemplary embodiment, the pads 230 may be electrically connected to both ends of the first edge conductive pattern 212 and the second edge conductive pattern 222 through wirings. According to another exemplary embodiment, the pads 230 may be integrally formed with the first edge conductive pattern 212 and the second edge conductive pattern 222.

The pads 230 are used to apply a joule heat generation voltage so that the first edge conductive pattern 212 and the second edge conductive pattern 222 may generate joule heat. The joule heat generation voltage differs according to materials, widths, and lengths of the first edge conductive pattern 212 and the second edge conductive pattern 222, and may be in the range of several tens of volts to several hundreds of volts. The joule heat generation voltage is applied to two of the pads 230 disposed at opposing ends of the first edge conductive pattern 212 and the second edge conductive pattern 222. According to the application of the joule heat generation voltage, a current flows through the first edge conductive pattern 212 and/or the second edge conductive pattern 222, and thus, the joule heat is generated in the first edge conductive pattern 212 and the second edge conductive pattern 222. As described above, because the first edge conductive pattern 212 and the second edge conductive pattern 222 are formed through the low temperature process, the first edge conductive pattern 212 and the second edge conductive pattern 222 may have a higher resistivity than conductive patterns formed through a high temperature sputtering process. The edge conductive pattern 212 and the second edge conductive pattern 222 may be at least partly melted by the joule heat. As a result, spaces between conductive particles included in the edge conductive pattern 212 and the second edge conductive pattern 222 are reduced, and lattice defects, such as dislocations, are corrected or prevented. Thus, the resistivity of the edge conductive pattern 212 and the second edge conductive pattern 222 is further reduced as a result of the joule heat.

According to the joule heat generated by the edge conductive pattern 212 and the second edge conductive pattern 222, resistivity and sheet resistance of the first transparent conductive pattern 211 and the second transparent conductive pattern 221, whose edges at least partly contact the edge conductive pattern 212 and the second edge conductive pattern 222, are reduced. As described above, the first transparent conductive pattern 211 and the second transparent conductive pattern 221 are formed through the low temperature process, and have a sheet resistance several tens to thousands of times greater than that of a transparent conductive pattern formed through the high temperature sputtering process. Edges and at least a part of the first transparent conductive pattern 211 and the second transparent conductive pattern 221 may be melted as a result of the joule heat generated by the edge conductive pattern 212 and the second edge conductive pattern 222. As a result, spaces between conductive particles included in the first transparent conductive pattern 211 and the second transparent conductive pattern 221 are reduced, and lattice defects, such as dislocations, are corrected or prevented. Thus, the sheet resistance of the first transparent conductive pattern 211 and the second transparent conductive pattern 221 is further reduced as a result of the joule heat. Transparency of the first transparent conductive pattern 211 and the second transparent conductive pattern 221 may be improved.

The sheet resistance of edges of the first transparent conductive pattern 211 and the second transparent conductive pattern 221 may be at least ten times lower than that of the centers thereof. The edges of the first transparent conductive pattern 211 and the second transparent conductive pattern 221 are melted by the joule heat, whereas the centers thereof may not be melted.

According to another exemplary embodiment, the sheet resistance of edges of the first transparent conductive pattern 211 and the second transparent conductive pattern 221 may be at least two times lower than that of the centers thereof. The edges of the first transparent conductive pattern 211 and the second transparent conductive pattern 221 are melted by the joule heat, whereas the centers thereof are partly melted.

According to another exemplary embodiment, the touch screen panel 200 may not include the pads 230. The joule heat generation voltage may be directly applied to ends of the edge conductive pattern 212 and the second edge conductive pattern 222.

The touch screen panel 200 may correspond to the touch screen panels 10 and 10b of FIG. 1A through FIG. 1D, and may be employed in the flat panel display apparatuses 100a through 100d integrated touch screen panels.

Figure 3A:
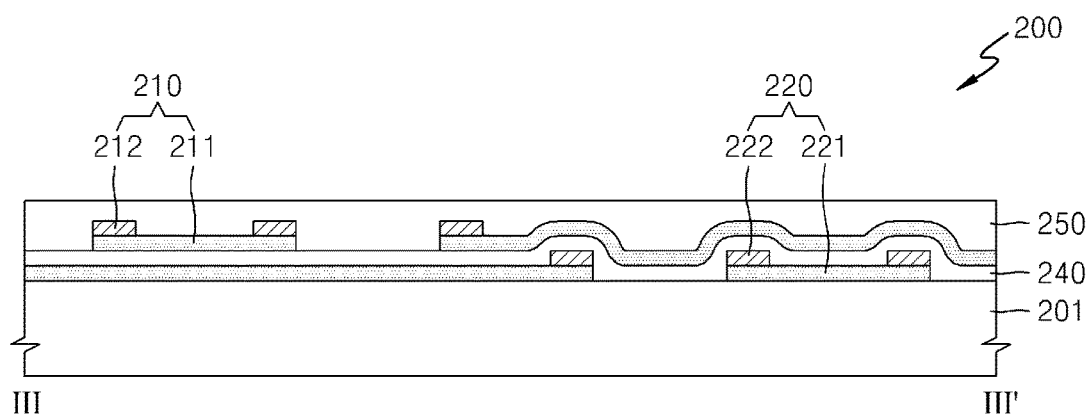
FIG. 3A is a schematic cross-sectional view taken along a line III-III' of FIG. 2.

FIG. 3A is a schematic cross-sectional view taken along a line III-III' of the touch screen panel 200 of FIG. 2.

Referring to FIG. 3A, the touch screen panel 200 includes a substrate 201, a second touch detection pattern 220 formed on the substrate 201, and first touch detection patterns 210 formed on the second touch detection pattern 220.

The substrate 201 may be a glass substrate, a transparent plastic substrate, or a thin film encapsulation layer. The substrate 201 may be the sealing substrate 23 of the display apparatus 20 of FIG. 1A, the substrate 21 of the display apparatus 20 of FIG. 1B, or the thin film encapsulation layer 25 of the display apparatus 20 of FIG. 1D.

The second transparent conductive pattern 221 may be formed on the substrate 201 through a low temperature process. The second transparent conductive pattern 221 may be formed using a screen printing process or an inkjet printing process.

The second edge conductive pattern 222 may be formed on an edge of the second transparent conductive pattern 221 through a low temperature process. The second edge conductive pattern 222 may be formed using the screen printing process or the inkjet printing process.

A low resistance process which lowers the resistivity of the second edge conductive pattern 222 and a sheet resistance of the second transparent conductive pattern 221 may be performed by applying a joule heat generation voltage to both ends of the second edge conductive pattern 222.

The insulating layer 240 may be formed on the second transparent conductive pattern 221 and the second edge conductive pattern 222. The insulating layer 240 may be formed through a low temperature process, such as the screen printing process or the inkjet printing process.

The first transparent conductive pattern 211 may be formed on the insulating layer 240 through a low temperature process. The second transparent conductive pattern 221 may be formed through the screen printing process or the inkjet printing process.

The first edge conductive pattern 212 may be formed on an edge of the first transparent conductive pattern 211 through a low temperature process. The first edge conductive pattern 212 may be formed through the screen printing process or the inkjet printing process.

A low resistance process which lowers the resistivity of the first edge conductive pattern 212 and a sheet resistance of the first transparent conductive pattern 211 may be performed by applying the joule heat generation voltage to both ends of the first edge conductive pattern 212.

According to another exemplary embodiment, the low resistivity process of the second transparent conductive pattern 221 and the second edge conductive pattern 222, and the low resistivity process of the first transparent conductive pattern 211 and the first edge conductive pattern 212 are continuously performed. In this case, the second edge conductive pattern 222 is not covered by the insulating layer 240 but is instead exposed, or a pad electrically connected to the second edge conductive pattern 222, is exposed.

A protection layer 250 may be formed on the first transparent conductive pattern 211 and the first edge conductive pattern 212. The protection layer 250 may be formed through a low temperature process, such as the screen printing process or the inkjet printing process. According to another exemplary embodiment, the protection layer 250 may be formed by using, for example, a spin coating method. As shown in FIG. 3A, the first transparent conductive pattern 211 may be disposed on a layer different from the second transparent conductive pattern 221.

Figure 3B:
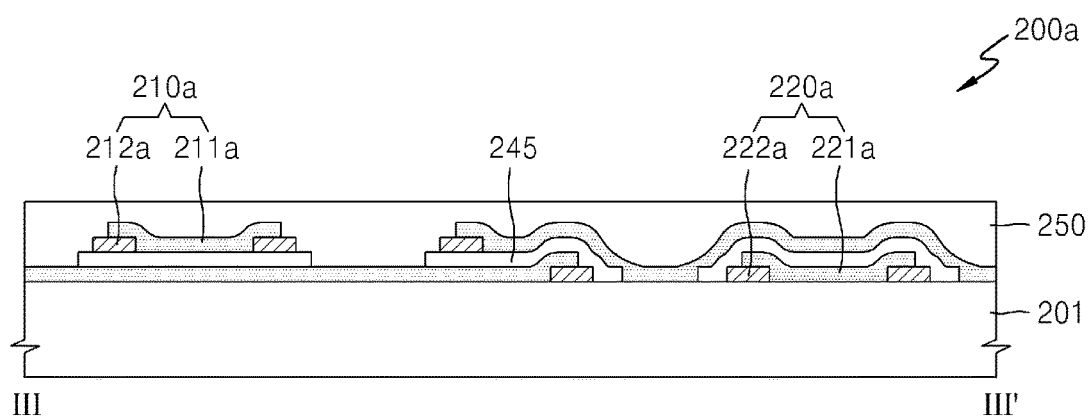
FIG. 3B is a schematic cross-sectional view taken along the line III-III' of FIG. 2.

FIG. 3B is a schematic cross-sectional view taken along the line III-III' of the touch screen panel 200a of FIG. 2, according to another exemplary embodiment of the present invention.

Referring to FIG. 3B, the touch screen panel 200a includes the substrate 201, a second touch detection pattern 220a formed on the substrate 201, and first touch detection patterns 210 formed on the second touch detection pattern 220a. The substrate 201 is described with reference to FIG. 3A, and thus, a redundant description thereof is not provided here.

A second edge conductive pattern 222a in a rectangular ring shape may be formed on the substrate 201 through a low temperature process, such as a screen printing process or an inkjet printing process.

A second transparent conductive pattern 221a may be formed inside of the second edge conductive pattern 222a through a low temperature process, such as the screen printing process or the inkjet printing process. As shown in FIG. 3B, the second transparent conductive pattern 221a may be disposed to contact a part of the second edge conductive pattern 222a. According to another exemplary embodiment, the second transparent conductive pattern 221a may contact the entire upper surface of the second edge conductive pattern 222a.

Insulating patterns 245 may be formed on some regions of the second transparent conductive pattern 221a and the second edge conductive pattern 222a. The insulating patterns 245 may be formed through a low temperature process, such as the screen printing process or the inkjet printing process. According to another exemplary embodiment, an insulating layer that substantially covers the entire region of the second transparent conductive pattern 221a and the second edge conductive pattern 222a may be formed instead of the insulating patterns 245.

A first edge conductive pattern 212a may be formed on the substrate 201 and the insulating patterns 245 in a rectangular ring shape through a low temperature process, such as the screen printing process or the inkjet printing process.

A first transparent conductive pattern 211a may be formed inside of the first edge conductive pattern 212a through a low temperature process, such as the screen printing process or the inkjet printing process.

A low resistance process which lowers the resistivity of the second edge conductive pattern 222a and a sheet resistance of the second transparent conductive pattern 221a may be performed by applying a joule heat generation voltage to both ends of the second edge conductive pattern 222a. A low resistance process which lowers the resistivity of the first edge conductive pattern 212a and a sheet resistance of the first transparent conductive pattern 211a may be performed by applying the joule heat generation voltage to both ends of the first edge conductive pattern 212a.

The protection layer 250 may be formed on the substrate 201. The protection layer 250 may be formed through a low temperature process, such as the screen printing process or the inkjet printing process.

Figure 4A:
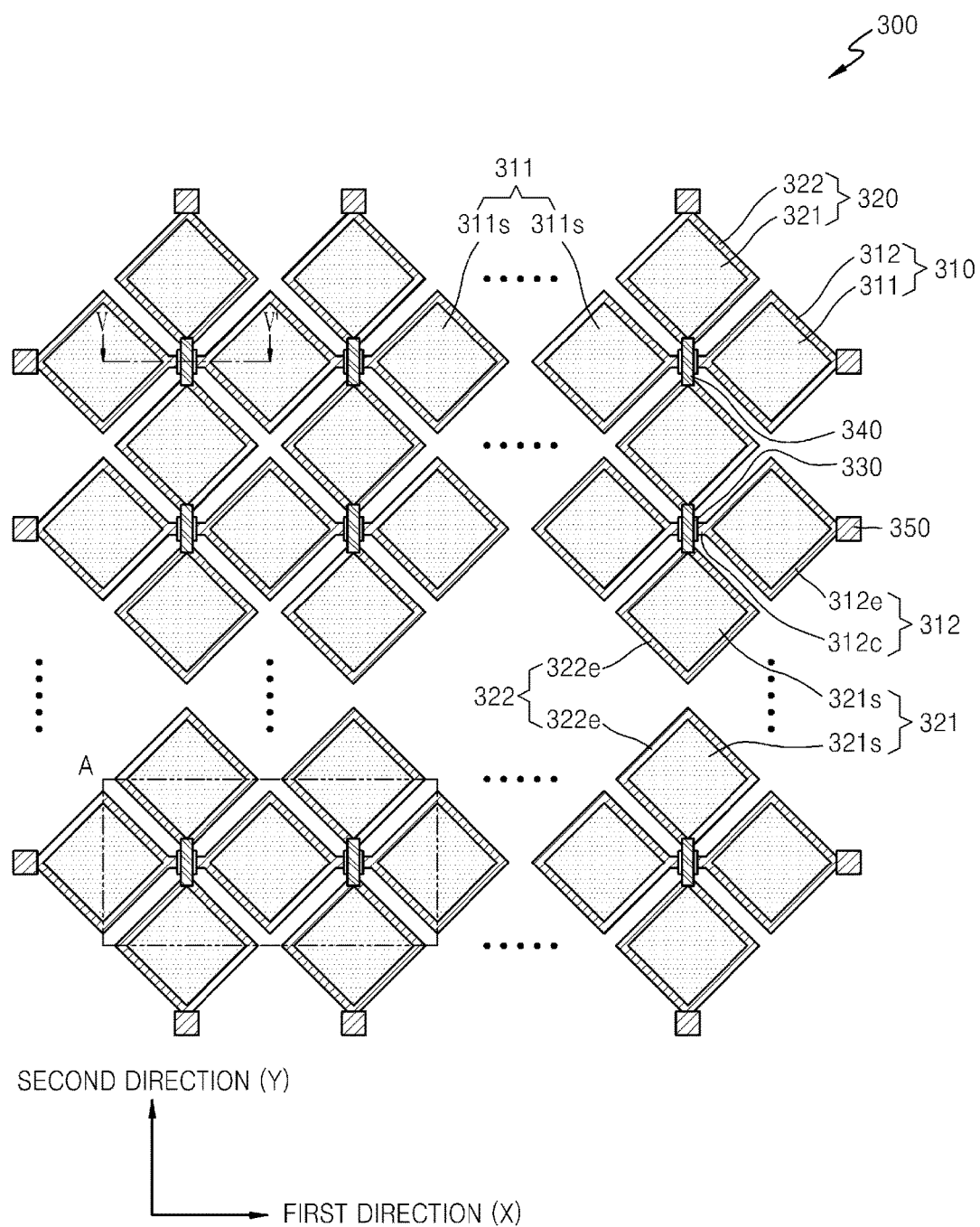
FIG. 4A is a schematic plan view of a touch screen panel according to another exemplary embodiment of the present invention.
Figure 4B:
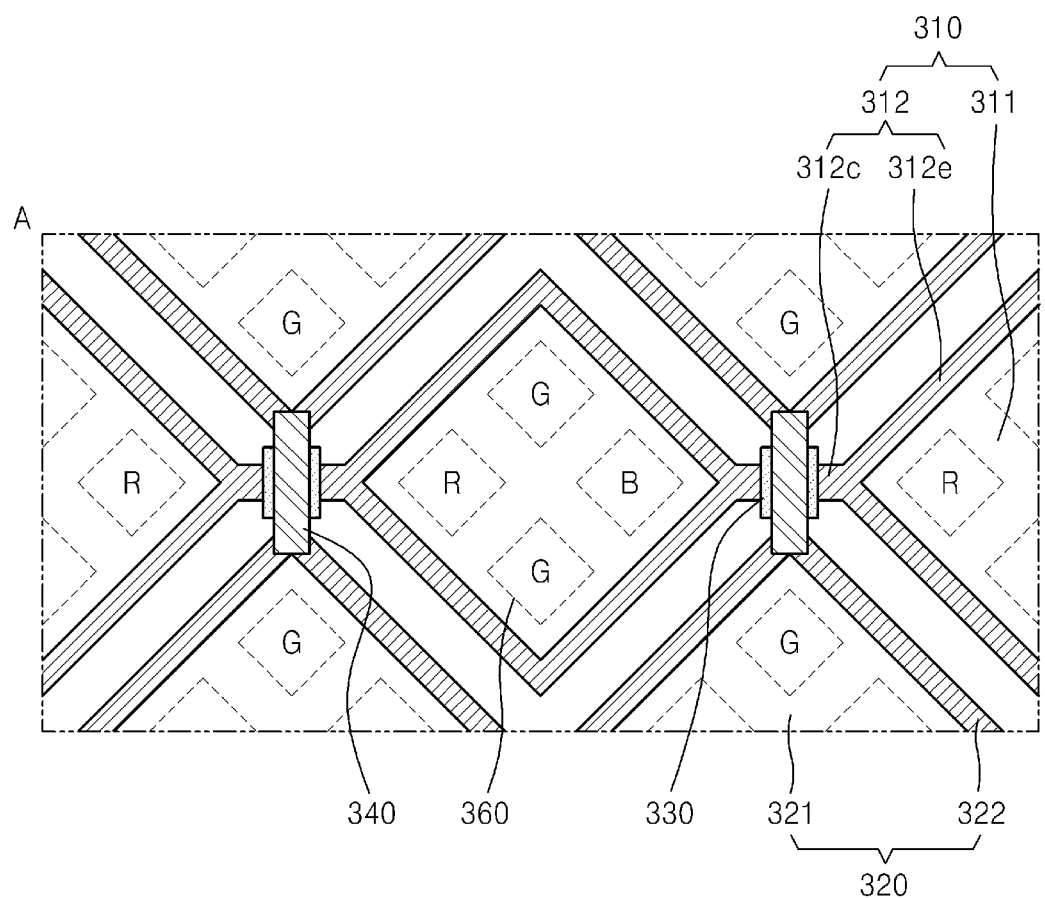
FIG. 4B is an enlarged view of region A of the touch screen panel of FIG. 4A.

FIG. 4A is a schematic plan view of a touch screen panel 300 according to another exemplary embodiment of the present invention. FIG. 4B is an enlarged view of a region A of the touch screen panel 300 of FIG. 4A.

Referring to FIGS. 4A and 4B, the touch screen panel 300 includes first touch detection patterns 310, second touch detection patterns 320, and connection patterns 340. The first touch detection patterns 310 extend in the first direction X, and the second touch detection patterns 320 extend in the second direction Y. The first touch detection patterns 310 and the second touch detection patterns 320 may be connected to a touch detection controller (not shown) through wirings. One of the first touch detection patterns 310 and the second touch detection patterns 320 functions as a driving electrode, and another functions as a detection electrode.

The first touch detection patterns 310 include a first transparent conductive pattern 311 and a first edge conductive pattern 312 surrounding an edge of the first transparent conductive pattern 311. The first transparent conductive pattern 311 includes first detection cells 311s that are spaced apart from each other in the first direction X. The first edge conductive pattern 312 includes edge portions 312e surrounding edges of the first detection cells 311s and connection portions 312c connecting the edge portions 312e in the first direction X. The connection portions 312c and the edge portions 312e are continuously and alternately connected to each other in the first direction X.

The second touch detection patterns 320 include a second transparent conductive pattern 321 and a second edge conductive pattern 322 surrounding an edge of the second transparent conductive pattern 321. The second transparent conductive pattern 321 includes second detection cells 321s that are spaced apart from each other in the second direction Y. The second edge conductive pattern 322 includes edge patterns 322e surrounding edges of the second detection cells 321s. The edge patterns 322e are spaced apart from each other in the second direction Y.

The first detection cells 311s and the second detection cells 321s may be formed of a transparent metal oxide. The first detection cells 311s and the second detection cells 321s may be disposed on the same layer, and may be simultaneously formed through a low temperature process.

The first edge conductive pattern 312 and the second edge conductive pattern 322 may be formed of metal, and may be disposed on the same layer. The first edge conductive pattern 312 and the second edge conductive pattern 322 may be formed to directly contact at least a part of upper surfaces or lower surfaces of the first detection cells 311s and the second detection cells 321s. The first edge conductive pattern 312 and the second edge conductive pattern 322 may be simultaneously formed through a low temperature process, such as a screen printing process or an inkjet printing process.

The connection patterns 340 connect the edge patterns 322e that are spaced apart from each other in the second direction Y to each other. The edge patterns 322e and the connection patterns 340 are alternately and electrically connected to each other in the second direction Y. The connection patterns 340 may be formed of metal. The connection patterns 340 may be formed of the same metal as that of the first edge conductive pattern 312 and the second edge conductive pattern 322. According to another exemplary embodiment, the connection patterns 340 may be formed of metals different from those of the first edge conductive pattern 312 and the second edge conductive pattern 322. The connection patterns 340 may be formed through the screen printing process that uses a conductive paste, such as a metal paste, or through the inkjet printing process that uses a conductive ink including metal particles.

As shown in FIGS. 4A and 4B, the connection portions 312c extending in the first direction X and the connection patterns 340 extending in the second direction Y cross each other. Insulating patterns 330 may be disposed where the connection portions 312c and the connection patterns 340 cross each other so that the connection portions 312c and the connection patterns 340 may not be electrically connected to each other. Although the connection patterns 340 are disposed on the connection portions 312c in FIGS. 4A and 4B, the connection patterns 340 may be disposed below the connection portions 312c.

Although the first detection cells 311s are formed of a metal oxide having a relatively high resistivity, because edges of the first detection cells 311s are connected to the first edge conductive patterns 312 having a relatively low resistivity, the first touch detection patterns 310 may generally have a low resistance. Although resistivity of the second detection cells 321s is high, because edges of the second detection cells 321s are connected to the edge patterns 322e via the connection patterns 340, the second touch detection pattern 320 may also generally have a low resistance. Thus, an RC delay is reduced, thereby promptly detecting a touch location. Furthermore, attenuation of a signal is reduced, which reduces an erroneous detection of the touch location due to noise, thereby more accurately detecting the touch location.

Pads 350 are connected to both ends of the first touch detection pattern 310 and both ends of the second touch detection pattern 320. The pads 350 are used to apply a joule heat generation voltage to the first edge conductive pattern 312 or the second edge conductive pattern 322. According to another exemplary embodiment, the pads 350 may be omitted and, in this case, the joule heat generation voltage may be directly applied to both ends of the first edge conductive pattern 312 and both ends of the second edge conductive pattern 322.

If the joule heat generation voltage is applied, joule heat is generated in the first edge conductive pattern 312, the second edge conductive pattern 322, and the connection patterns 340. The first edge conductive pattern 312, the second edge conductive pattern 322, and the connection patterns 340 may be at least partially melted due to the joule heat. As a result, spaces between conductive particles included in the first edge conductive pattern 312 and the second edge conductive pattern 322 are reduced, and lattice defects, such as dislocations, are corrected or prevented. Thus, the resistivity of the first edge conductive pattern 312 and the second edge conductive pattern 322 is further reduced, and the resistance of the first touch detection pattern 310 and the second touch detection pattern 320 is also generally reduced. According to the melting due to the joule heat, the second edge conductive pattern 322 and the connection patterns 340 may be more securely coupled to each other. Thus, durability of the touch screen panel 300 may be enhanced.

As a result of the joule heat generated by the first edge conductive pattern 312 and the second edge conductive pattern 322, resistivity and sheet resistance of the first detection cells 311s and the second detection cells 312s that contact the first edge conductive pattern 312 and the second edge conductive pattern 322 are reduced. The sheet resistance of edges of the first detection cells 311s and the second detection cells 312s may be lower than that of centers thereof. Transparency of the first detection cells 311s and the second detection cells 312s may be improved.

Sub-pixel emissive portions 360 are shown in FIG. 4B. The sub-pixel emissive portions 360 are disposed below the first detection cells 311s and the second detection cells 312s, as shown in FIG. 4B. Although the four sub-pixel emissive portions 360 are exemplarily disposed below the first detection cells 311s and the second detection cells 312s as shown in FIG. 4B, a smaller or greater number of the sub-pixel emissive portions 360 may be disposed. For example, an organic emissive layer is disposed in the sub-pixel emissive portions 360 so that the sub-pixel emissive portions 360 may be defined as a region that emits light in sub-pixels. Spaces between the sub-pixel emissive portions 360 do not emit light, and thus, the spaces may be defined as a non-emissive region. The first edge conductive pattern 312, the second edge conductive pattern 322, and the connection patterns 340 may be disposed on the non-emissive region. Thus, light emitted in the sub-pixel emissive portions 360 is not hidden or interfered with by the first edge conductive pattern 312, the second edge conductive pattern 322, and the connection patterns 340.

The touch screen panel 300 may correspond to the touch screen panels 10 and 10b of FIG. 1A through FIG. 1D, and may be employed in the flat panel display apparatuses 100a through 100d integrated touch screen panels.

Figure 5:
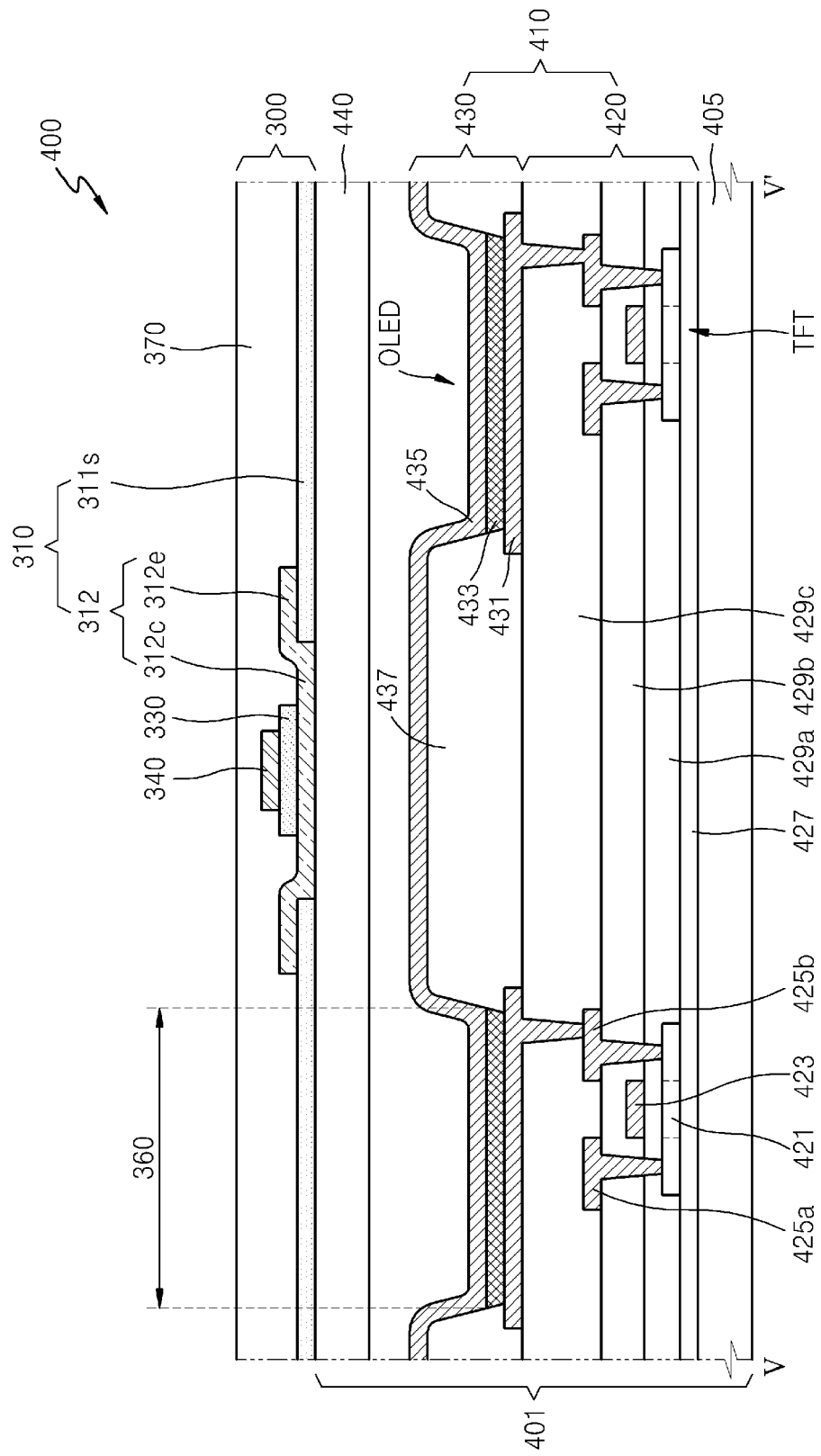
FIG. 5 is a schematic cross-sectional view of an organic light emitting display apparatus integrated touch screen panel according to an exemplary embodiment of the present invention.

FIG. 5 is a schematic cross-sectional view of an organic light emitting display apparatus 400 integrated touch screen panel according to an exemplary embodiment of the present invention.

Referring to FIG. 5, the organic light emitting display apparatus 400 integrated touch screen panel corresponds to the flat panel display apparatus 100a integrated with the touch screen panel 10 of FIG. 1A. A touch screen panel 300 of FIGS. 4A and 4B is employed as the touch screen panel 10 of the flat panel display apparatus 100a integrated touch screen panel. An organic light emitting display apparatus is employed as the display apparatus 20 of the flat panel display apparatus 100a integrated touch screen panel. The cross-sectional view of FIG. 5 is taken along a line V-V' of the touch screen panel 300 of FIG. 4A.

The organic light emitting display apparatus 400 integrated touch screen panel includes a display apparatus 401 and the touch screen panel 300. The display apparatus 401 includes a substrate 405, a display unit 410 disposed on the substrate 405, and a sealing substrate 440 disposed on the display unit 410. The display apparatus 401 corresponds to the display apparatus 20 of FIG. 1A. The substrate 405, the display unit 410, and the sealing substrate 440 correspond to the substrate 21, the display unit 22, and the sealing substrate 23 of FIG. 1A, respectively. The touch screen panel 300 corresponds to the touch screen panel 10 of FIG. 1A.

The substrate 405 may be an insulating rigid substrate formed of a transparent glass material having silicon dioxide ($SiO_2$) as a main component, or an insulating flexible substrate formed of a transparent plastic material, but is not limited thereto. The substrate 405 may include a different type of substrate, such as a conductive substrate formed of a thin film metal material.

The display unit 410 may be disposed on the substrate 405. The term "display unit 410" used in the present specification refers to an organic light emitting device (OLED) and a TFT array for driving the OLED.

The display unit 410 includes pixels arranged in a matrix shape. Each pixel includes the OLED and an electronic device electrically connected to the OLED. The electronic device may include at least two TFTs, including a driving TFT and a switching TFT, and a storage capacitor. The electronic device may be electrically connected to wirings and may be driven by receiving an electrical signal from an external driving circuit. Such an arrangement of the electronic device electrically connected to the OLED and the wirings refers to the TFT array.

The display unit 410 includes a device/wiring layer 420 including the TFT array and an organic emissive device layer 430 including an OLED array.

The device/wiring layer 420 may include a driving TFT for driving the OLED, a switching TFT (not shown), a capacitor (not shown), and wirings (not shown) connected to the driving and switching TFTs or the capacitor.

A buffer layer 427 may be disposed on the substrate 405 to prevent impurities from penetrating into the substrate 405. The buffer layer 427 may be formed of an inorganic insulating material.

An active layer 421 may be disposed on the buffer layer 427. The active layer 421 may be formed by forming a semiconductor layer, such as an inorganic semiconductor or an organic semiconductor on the substrate 405 on which the buffer layer 427 is disposed, and patterning the semiconductor layer by using a photolithography process and an etching process. When the active layer 421 is formed of a silicon material, the active layer 421, including a source region, a drain region, and a channel region therebetween, may be formed by forming and crystallizing an amorphous silicon layer on the substrate 405, forming and patterning a polycrystalline silicon layer, and doping peripheral regions with impurities.

A gate insulating layer 429a may be disposed on the active layer 421. A gate electrode 423 may be disposed in a region on the gate insulating layer 429a. The gate electrode 423 may be connected to a gate line (not shown) to which a control signal for controlling the TFT is applied. An interlayer insulating layer 429b may be disposed on the gate electrode 423. The interlayer insulating layer 429b may include contact holes to expose the source region and the drain region. A source electrode 425a and a drain electrode 425b may be electrically connected to the source region and the drain region of the active layer 421 through the contact holes of the interlayer insulating layer 429b, respectively. The TFT may be covered and protected by a passivation layer 429c. The passivation layer 429c may include an inorganic insulating layer and/or an organic insulating layer. The passivation layer 429c may have a complex stack structure of the inorganic insulating layer and the organic insulating layer. The OLED may be disposed on the passivation layer 429c.

The organic emissive device layer 430 may include a pixel electrode 431 formed on the passivation layer 429c, an opposite electrode 435 disposed to face the pixel electrode 431, and an intermediate layer 433 disposed between the pixel electrode 431 and the opposite electrode 435.

In a bottom emissive type organic light emitting display apparatus, the pixel electrode 431 functions as a light transmittance electrode, and the opposite electrode 435 functions as a reflective electrode. In a top emissive type organic light emitting display apparatus, the pixel electrode 431 functions as the reflective electrode, and the opposite electrode 435 functions as a semi-transmittance electrode. Hereinafter, the OLED will be described as a top emissive type in which light is emitted toward the sealing substrate 440.

The pixel electrode 431 may be the reflective electrode. The pixel electrode 431 may have a stack structure including a reflective layer and a transparent or semi-transparent electrode layer having a high work function. The pixel electrode 431 may serve as an anode electrode.

A pixel defining layer 437 that coves edges of the pixel electrode 431 and includes an opening to expose a center of the pixel electrode 431 may be disposed on the pixel electrode 431. The intermediate layer 433, including an organic emissive layer that emits light, may be disposed on a region limited by the opening. The region limited by the opening may be defined as an emissive region, and a region on which the pixel defining layer 437 is disposed may be defined as a non-emissive region.

The opposite electrode 435 may be formed as a transmittance electrode. The opposite electrode 435 may be the semi-transmittance electrode formed of thin metal with a low work function. To supplement a high resistance of the thin metal semi-transmittance electrode, a transparent conductive layer formed of a transparent conductive oxide may be stacked on the thin metal semi-transmittance electrode. The opposite electrode 435 may be formed throughout the substrate 405 as a common electrode, and may serve as a cathode electrode. According to another exemplary embodiment, polarities of the pixel electrode 431 and the opposite electrode 435 may be switched.

The intermediate layer 433 includes the organic emissive layer that emits light. The organic emissive layer may use a low-molecular weight organic material or a polymer organic material. When the organic emissive layer is a low-molecular weight organic layer formed of a low-molecular weight organic material, a hole transport layer (HTL) and a hole injection layer (HIL) may be disposed toward the pixel electrode 431 from the organic emissive layer, and an electron transport layer (ETL) and an electron injection layer (EIL) may be disposed toward the opposite electrode 435 from the organic emissive layer. When the organic emissive layer is a polymer organic layer formed of a polymer organic material, the HTL may be provided toward the pixel electrode 431 from the organic emissive layer.

Although the organic emissive device layer 430 is disposed on the device/wiring layer 420 in which the driving TFT is disposed in FIG. 5, the present invention is not limited thereto. A variety of modifications, including a structure in which the pixel electrode 431 of the OELD is formed on the same layer as the active layer 421 of the TFT, a structure in which the pixel electrode 431 is formed on the same layer as the gate electrode 423 of the TFT, and a structure in which the pixel electrode 431 is formed on the same layer as the source and drain electrodes 425a and 425b, may be made.

Although the gate electrode 432 of the driving TFT is disposed on the active layer 421 in FIG. 5, the present invention is not limited thereto. The gate electrode 423 may be disposed below the active layer 421.

The sealing substrate 440 may be disposed on the substrate 405 to seal the display unit 410. The OLED included in the display unit 410 is formed of an organic material and thus the OLED may easily deteriorate due to external moisture or oxygen. Thus, the display unit 410 needs to be sealed so as to protect the display unit 410. The sealing substrate 440 may include a transparent glass substrate or a transparent plastic substrate used to seal the display unit 410. The substrate 405 and the sealing substrate 440 may be sealed by using the sealant (24 of FIG. 1). A moisture absorbent or a filter may be inserted into a space between the display unit 410 and the sealing substrate 440.

The touch screen panel 300 is disposed on the sealing substrate 440. The substrate 405 and the sealing substrate 440 may be made thin by using an etch-back process, or a mechanical and chemical polishing process.

The first transparent conductive pattern 311 and the second transparent conductive pattern 321 are simultaneously formed on the sealing substrate 440 through a low temperature process, such as a screen printing process or an inkjet printing process. As described with reference to FIGS. 4A and 4B, the first transparent conductive pattern 311 includes the first detection cells 311s, and the second transparent conductive pattern 321 includes the second detection cells 321s.

The first edge conductive pattern 312 and the second edge conductive pattern 322 are simultaneously formed on the first transparent conductive pattern 311 and the second transparent conductive pattern 321 through a low temperature process, such as the screen printing process or the inkjet printing process. As described above, the first edge conductive pattern 312 includes the edge portions 312e surrounding edges of the first detection cells 311s and the connection portions 312c connecting the edge portions 312e in the first direction X. The second edge conductive pattern 322 includes the edge patterns 322e surrounding edges of the second detection cells 321s.

The insulating patterns 330 may be disposed on the connection portions 312c. The insulating patterns 330 may be formed through a low temperature process, such as the screen printing process or the inkjet printing process.

The connection patterns 340 used to connect the edge patterns 322 in the second direction Y are disposed on the insulating patterns 330. The connection patterns 340 may be formed through a low temperature process, such as the screen printing process or the inkjet printing process, and may be formed of the same material as those of the first edge conductive pattern 312 and the second edge conductive pattern 322.

Resistivity of the first edge conductive pattern 312 and a sheet resistance of the first detection cells 311s may be reduced by applying a joule heat generation voltage to both ends of the first edge conductive pattern 312. Resistivity of the edge patterns 322e and the connection patterns 340 and a sheet resistance of the second detection cells 321s may be reduced by applying the joule heat generation voltage to the edge patterns 322e alternately connected in the second direction Y and the connection patterns 340.

A protection layer 370 may be formed on the sealing substrate 440 so as to protect the first transparent conductive pattern 311 and the second transparent conductive pattern 321, the first edge conductive pattern 312 and the second edge conductive pattern 322, and the connection patterns 340 that are formed on the sealing substrate 440. The protection layer 370 may be formed through a low temperature process, such as the screen printing process or the inkjet printing process. According to another exemplary embodiment, the protection layer 370 may be formed by using a spin coating method.

According to another exemplary embodiment, although not shown in FIG. 5, the connection patterns 340 may be formed on the sealing substrate 440, the insulating patterns 330 may be formed on the connection patterns 340, the first edge conductive pattern 312 and the second edge conductive pattern 322 may be formed on the insulating patterns 330, and the first transparent conductive pattern 311 and the second transparent conductive pattern 321 may be formed on the first edge conductive pattern 312 and the second edge conductive pattern 322.

As described above, according to the exemplary embodiments of the present invention, a flat panel display apparatus may have a relatively small thickness while being integrated with a touch screen panel, and a conductive layer of the touch screen panel may have a relatively low resistance. Thus, a high touch sensitivity may be achieved.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments of the present invention have been described with reference to the figures, it will be apparent to those skilled in the art that various modifications and variations can be made in the present invention without departing from the spirit and scope of the present invention as defined by the following claims. Thus, it is intended that the present invention cover the modifications and variations of this invention provided they come within the scope of the appended claims and their equivalents.

What is claimed is:

1. A touch screen panel comprising:
   first touch detection patterns extending in a first direction and spaced apart from each other in a second direction perpendicular to the first direction; and
   second touch detection patterns extending in the second direction and spaced apart from each other in the first direction,
   wherein:
   each of the first touch detection patterns comprises a first transparent conductive pattern and a first edge conductive pattern surrounding the first transparent conductive pattern;
   each of the second touch detection patterns comprises a second transparent conductive pattern and a second edge conductive pattern surrounding the second transparent conductive pattern,
   the first transparent conductive pattern and the first edge conductive pattern are formed through a low temperature process, and the second transparent conductive pattern and the second edge conductive pattern are formed through a low temperature process, and
   the first touch detection patterns and the second touch detection patterns are configured such that a joule heat generation voltage is applied to the first edge conductive pattern and the second edge conductive pattern such that joule heat is generated to lower resistivities of at least the first edge conductive pattern and the second edge conductive pattern, and
   the resistivities of the first edge conductive pattern and the second edge conductive pattern are lower than that of the first transparent conductive pattern and the second transparent conductive pattern.

2. The touch screen panel of claim 1, wherein a sheet resistance of the edges of the first transparent conductive pattern and the second transparent conductive pattern is lower than that of centers thereof.

3. The touch screen panel of claim 1, wherein the first edge conductive pattern and the second edge conductive pattern directly contact at least a part of an upper portion or a lower portion of each of the first transparent conductive pattern and the second transparent conductive pattern.

4. The touch screen panel of claim 1, wherein:
   the first touch detection patterns are disposed on a first layer, and the second touch detection patterns are disposed on a second layer that is different from the first layer; and
   the first touch detection patterns and the second touch detection patterns are spaced apart from each other and cross each other.

5. The touch screen panel of claim 1, wherein:
   the first transparent conductive pattern comprises first detection cells that are spaced apart from each other in the first direction;
   the first edge conductive pattern comprises:
   edge portions surrounding the first detection cells; and
   connection portions connecting the edge portions in the first direction; and
   the edge portions and the connection portions are alternately and continuously connected to each other in the first direction.

6. The touch screen panel of claim 5, wherein:
   the second transparent conductive pattern comprises second detection cells that are spaced apart from each other in the second direction;
   the second edge conductive pattern comprises edge patterns surrounding the second detection cells; and
   the touch screen panel further comprises connection patterns connecting the edge patterns and extending in the second direction.

7. The touch screen panel of claim 6, wherein the first transparent conductive pattern is disposed on the same layer as the second transparent conductive pattern, and the first edge conductive pattern is disposed on the same layer as the second edge conductive pattern.

8. The touch screen panel of claim 6, wherein the connection patterns are spaced apart from and cross the connection portions and overlap the connection portions.

9. The touch screen panel of claim 1, wherein the first touch detection patterns and the second touch detection patterns further comprise pads that are connected to ends of the first edge conductive pattern and the second edge conductive pattern, the pads being configured to accept the applied joule heat generation voltage.

10. The touch screen panel of claim 9, wherein the pads are integrally formed with the first edge conductive pattern and the second edge conductive pattern.

11. A flat panel display apparatus comprising:
    a substrate extending in a first direction and a second direction perpendicular to the first direction;
    a display unit disposed on the substrate and comprising pixels;
    a sealing member disposed on the substrate and sealing the display unit; and
    a first touch screen panel disposed on one of the substrate and the sealing member, the first touch screen panel comprising:

first touch detection patterns extending in a first direction and spaced apart from each other in a second direction perpendicular to the first direction; and second touch detection patterns extending in the second direction and spaced apart from each other in the first direction, wherein:

each of the first touch detection patterns comprises a first transparent conductive pattern and a first edge conductive pattern surrounding the first transparent conductive pattern;

each of the second touch detection patterns comprises a second transparent conductive pattern and a second edge conductive pattern surrounding the second transparent conductive pattern, the first transparent conductive pattern and the first edge conductive pattern are formed through a low temperature process, and the second transparent conductive pattern and the second edge conductive pattern are formed through a low temperature process, and the first touch detection patterns and the second touch detection patterns are configured such that a joule heat generation voltage is applied to the first edge conductive pattern and the second edge conductive pattern such that joule heat is generated to lower resistivities of at least the first edge conductive pattern and the second edge conductive pattern, and the resistivities of the first edge conductive pattern and the second edge conductive pattern are lower than that of the first transparent conductive pattern and the second transparent conductive pattern.

12. The flat panel display apparatus of claim 11, further comprising: a second touch screen panel disposed on another one of the substrate and the sealing member that does not have the first touch screen panel disposed thereon.

13. The flat panel display apparatus of claim 12, wherein the flat panel display apparatus is a transparent display apparatus.

14. The flat panel display apparatus of claim 11, wherein each of the pixels comprises:
   a thin film transistor (TFT), a pixel electrode electrically connected to the TFT;
   an organic emissive layer disposed on the pixel electrode; and
   an opposite electrode disposed on the organic emissive layer.

15. The flat panel display apparatus of claim 14, wherein: the display unit comprises:
   emissive regions in which the organic emissive layers are disposed; and
   non-emissive regions in which the organic emissive layers are not disposed and in which the first and second edge conductive patterns are disposed.

16. The flat panel display apparatus of claim 11, wherein the sealing member comprises a sealing substrate disposed to face the substrate and a sealant disposed between the substrate and the sealing substrate.

* * * * *